United States Patent [19]

McEachern

[11] 4,220,850
[45] Sep. 2, 1980

[54] BIMODAL AUTOFOCUSING APPARATUS

[75] Inventor: Richard D. McEachern, Carrollton, Tex.

[73] Assignee: Abbott Laboratories, North Chicago, Ill.

[21] Appl. No.: 946,981

[22] Filed: Sep. 29, 1978

[51] Int. Cl.$^3$ .............................................. G01J 1/36
[52] U.S. Cl. ...................................... 250/204; 354/25
[58] Field of Search .................. 250/204, 201; 354/25; 356/4

[56] References Cited

U.S. PATENT DOCUMENTS

| | | |
|---|---|---|
| 3,851,156 | 11/1974 | Green . |
| 3,967,110 | 6/1976 | Rogers et al. . |
| 3,970,841 | 7/1976 | Green . |
| 3,999,047 | 12/1976 | Green . |
| 4,061,914 | 12/1977 | Green . |

OTHER PUBLICATIONS

Reticon RL-64p Solid State Line Scanner.

Primary Examiner—David C. Nelms
Assistant Examiner—Darwin R. Hostetter
Attorney, Agent, or Firm—John J. McDonnell

[57] ABSTRACT

A bimodal automatic lens focussing apparatus including detection and switching means for detecting a loss in a localized focal condition and switching to a search mode wherein the objective lens is scanned between its outer limits to reacquire focus. Photodiode arrays sense respective light images on either side of the desired focal plane, and the resulting signals are processed to drive the lens to the desired focal plane. A level discriminator monitors the processed signals. Upon detection of a loss of the localized focus condition a mode switch is gated to couple a ramp generator to the lens driver. The lens is scanned between its outer limits until the level discriminator again detects the localized focus condition and the ramp generator is decoupled from the lens driver.

10 Claims, 3 Drawing Figures

BIMODAL AUTOFOCUSING APPARATUS

This invention relates to automatic focussing apparatus for optical images, and particularly to a bimodal automatic lens focussing apparatus capable of rapid, highly accurate focussing over a relatively large dynamic range.

BACKGROUND OF THE INVENTION

Reference may be made to U.S. Pat. No. 3,967,110 which describes an automatic focussing system for positioning a microscope lens in the analysis of blood samples smeared and stained onto a laboratory slide in performing a white blood cell differential measurement. In the patent, there is described a system wherein a beam splitter splits a light beam which has been projected through the slide and an objective lens into one image used for sample analysis and another image used for automatically focussing the objective lens. The second image is directed to a rotating mirror which deflects or scans the image to a first light sensing device receiving light from in front of the desired focal plane and to a second light sensing device receiving light from behind the desired focal plane. The electrical signal output of the two light sensing devices is processed and used to drive a stepping motor to move the objective lens to the desired focal plane.

It is desired to provide such automatic lens focussing as rapidly as possible with reliable accuracy in order to prevent serious limitations on the instrumentation system throughput, i.e. the number of cells capable of being detected and measured per unit time. Where it is desired to significantly increase system throughput, any mechnical or moving parts such as the rotating mirror may present limiting factors. As an example, if it was desired to provide a white blood cell detection/measurement rate of 10 cells per second, necessitating light sensor scanning at about 500 scans per second, the mirror such as in the previously described system, if single sided, would have to be rotated at the prohibitive rate of 30,000 revolutions per minute.

Attempts have been made to eliminate the rotating mirror by using a pair of stationary photodiode arrays as light sensors, one located in front of and the other behind the desired focal plane. The respective stationary photodiode arrays could then be electronically scanned, thereby eliminating the rotating mirror, and the output signals used to move the objective lens to the desired focal plane. It has been found that using the electronically scanned photodiode arrays provides a highly accurate and precise focussing capability with high resolution. However, such accurate high focussing resolution results in a very localized focal condition which extends over a very narrow range—much less than the dynamic or capture range normally desired for an automatic focussing system. With increasing cell detection/measurement rates, there is a tendency for the automatic focussing system to lose the highly localized focal condition, thereby requiring the operator to manually reset focus and reacquire the localized focal condition. Thus, it is desired to provide an automatic lens focussing system which can have a large dynamic or capture focussing range, but also maintain a very accurate and precise focussing capability in a localized focal condition. Such a focussing system is particularly compatible with high speed, accurate, blood cell differential classifying instruments.

SUMMARY OF THE INVENTION

In accordance with the principles of the present invention there is provided a high speed, accurate, bimodal automatic lens focussing apparatus for an optical system. The apparatus includes a pair of photodiode arrays, each having a plurality of photodiode elements, the arrays being located to receive light respectively from in front of and behind the desired focal plane. Respective electronic scanning means scan the photodiode arrays and provide output signals which are differentiated, rectified and filtered to produce a respective DC output voltage proportional to the focus position of each array. The filter output signals are then amplified by a differential amplifier which produces a very high resolution signal to control the movement of the lens to the desired focal plane.

In accordance with the principle feature of this invention, bimodal operation is provided. In a first mode, the system is operating in a localized focal condition wherein the objective lens is rapidly moved into the desired focal plane from a possibly slightly out of focus condition. In a second mode—the search and scan mode—wherein the localized focal condition has been lost, the objective lens is automatically driven to traverse its entire dynamic focussing range from one limit to the other so as to reacquire the localized focal condition. Switching to the search and scan mode significantly extends the dynamic focussing range beyond the narrow localized focussing condition range. A constructed photodiode array focussing system in accordance with the bimodal aspect of the invention was determined to provide a dynamic focussing range of about 0.003 inch, compared to only 0.0005 inch for a similar, but single mode system.

Detection and switching means are provided for detecting loss of the localized focal condition, switching to the search and scan mode, and again switching back to the first mode upon detection of a localized focal condition. In the detection and switching means, the output from the respective filters is also fed to a level discriminator for detection of a non-localized focal condition. A mode switch means is coupled between the level discriminator, the differential amplifier and the objective lens driver. The mode switch means responds to the level discriminator output to decouple the differential amplifier from the lens driver upon detection of a non-localized focal condition and switches the focussing system to the search and scan mode. In the search and scan mode, a ramp generator is coupled by the mode switch means to the objective lens driver thereby moving the lens to traverse over its entire dynamic focussing range. When a localized focal condition is again detected by the level discriminator, the mode switch places the focussing system back into the normal operational mode.

DETAILED DESCRIPTION

Figure 1:
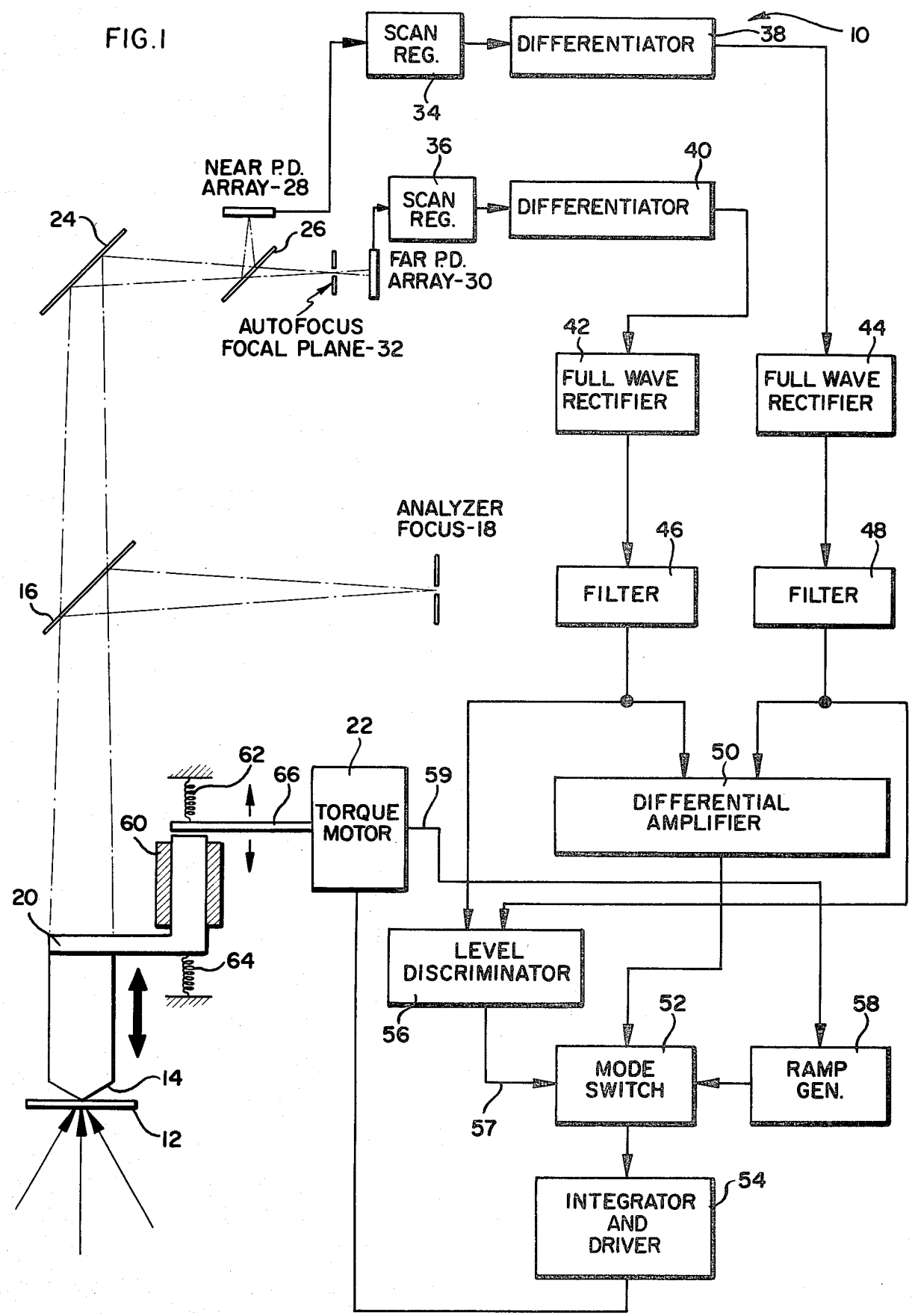
FIG. 1 is a schematic block diagram illustrating the components of a bimodal automatic lens focussing system constructed in accordance with the principles of the present invention.

Referring now to FIG. 1, there is illustrated an improved automatic lens focussing apparatus 10 illustrated in connection with a system for automatically analyzing slides. As an example, reference may be made to U.S. Pat. Nos. 3,851,156; 3,970,841; 3,999,047; and 4,061,914, all relating to an autofocussing system, which disclose instrumentation for analyzing and differentially classifying blood cells using colorimetric measurements. Generally, in connection with such instruments, a laboratory slide is prepared with the sample blood cells and a microscope is adjusted in position to focus on a particular cell being analyzed.

Referring now to FIG. 1, there is illustrated a light beam being directed sequentially to laboratory slide 12 containing sample blood cells, an objective lens 14, and a beam splitter 16 for directing the beam to the analyzer focal point 18 for colorimetric measurement of the light beam. The objective lens 14 is mounted to a frame 20 and coupled through suitable means illustrated to a torque motor 22 for adjusting the lens position with respect to slide 12 so as to bring the main beam to focus on analyzer focus point 18.

A portion of the main beam is diverted by a stationary mirror 24 to apparatus for automatically focussing lens 14 in accordance with the principles of the present invention. A beam splitter 26 directs one-half of the beam to a near array 28 of photodiodes and the other half of the beam to a far array 30 of photodiodes. The near photodiode array 28 and the far photodiode array 30 are placed at respective positions in front of and behind a desired focal plane 32. It is to be understood, of course, that adjusting the position of objective lens 14 to focus the light beam at the desired focal plane 32 will also place the main beam at the analyzer focus point 18.

Each of the photodiode arrays 28 and 30 includes a plurality of photodiode elements for receiving light from respective positions in the light beam. Respective scan registers 34, 36 electronically scan the photodiodes, register the scan information, and provide respective signals representing the intensity of the light images at respective locations in the light beam being observed by the associated photodiode array.

The respective output signals from scan registers 34, 36 are differentiated in differentiators 38, 40; fullwave rectified in respective rectifiers 42, 44; and filtered in respective filters 46, 48 to produce a direct current output voltage proportional to the focus position of each array.

Figure 2:
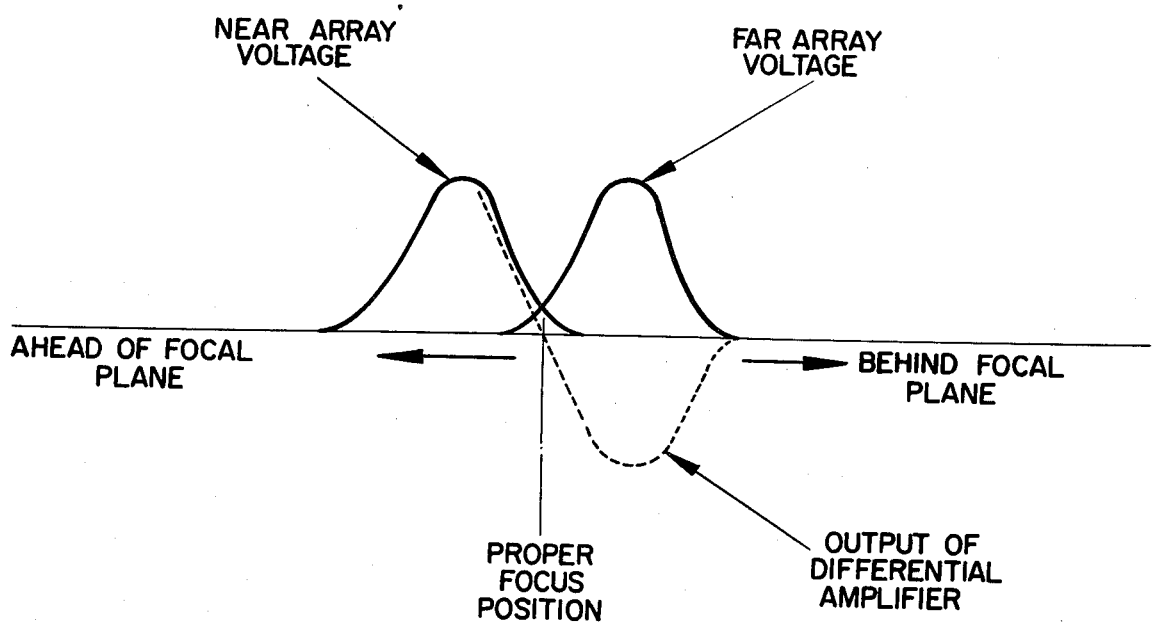
FIGS. 2 and 3 illustrates several signal waveforms in the system useful in understanding the present invention.

FIG. 2 illustrates the near array voltage waveform derived from the photodiode array 28 and the far array voltage waveform derived from the photodiode array 30 with respect to the desired focal plane 32 or the proper focus position as illustrated in FIG. 2. The voltage waveforms shown in FIG. 2 are provided at the respective outputs of filters 48 and 46 and are fed to a differential amplifier 50.

Amplifier 50 provides the difference between the outputs from respective filters 48 and 46. With reference to FIG. 2, the output of differential amplifier 50 is illustrated in dashed lines. The desired focal plane is derived from the point where the differential amplifier output signal waveform crosses the baseline. At this point the output derived from each photodiode array is equal, which coincides with the equidistant location of the desired focal plane between the near and far arrays.

In the normal mode of operation, the differential amplifier output signal is applied through a mode switch 52 to an integrator and driver 54. The differential amplifier output signal is integrated to provide an error voltage for driving torque motor 22 to move the lens 14 to a condition where the error voltage is zero, which is the optimum focus for the system. In normal operation, the system is operating in a localized focal condition mode. That is, the lens 14 is at or very near the desired focal plane and therefore the main beam is or can be rapidly focussed at the analyzer focus point 18. However, if the system loses focus such that the differential amplifier output is insufficient to provide proper drive signals to move the objective lens so as to again obtain proper focus, detection and switch means are provided for: (1) detecting this out of focus range condition; (2) placing the system into a search and scan mode; and (3) reacquiring the localized focal condition.

Figure 3:
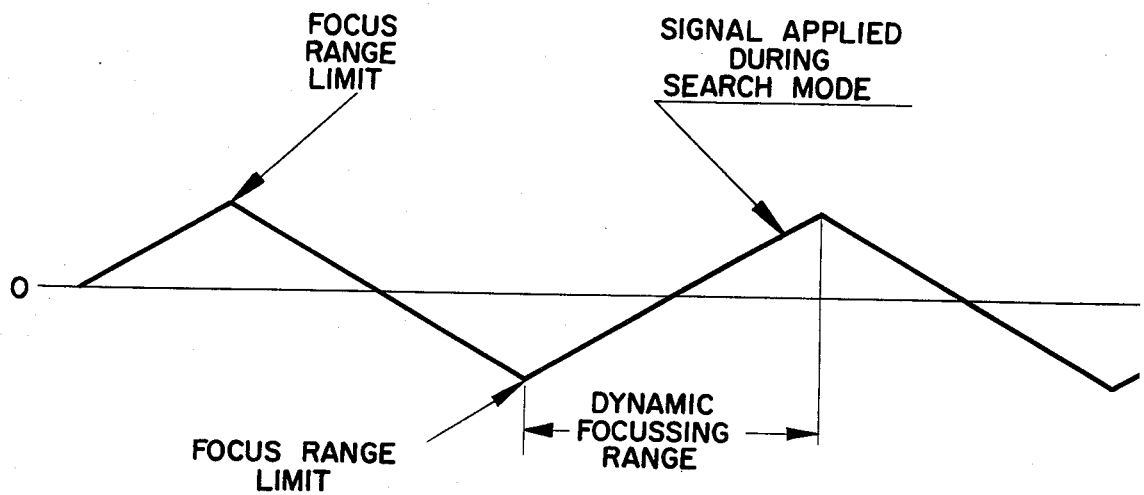

In particular, a level discriminator 56 is coupled to the outputs of the filters 46, 48 and includes means to compare the sum of the filter outputs with a preset level. If the sum falls below the preset level, which indicates not only a loss in focus but a condition where the system is completely out of the localized focus range, discriminator 56 couples a switching signal to mode switch 52 on switch line 57. A ramp generator 58 continuously supplies a ramp signal waveform shown in FIG. 3. The ramp generator output is blocked from the integrator and driver 54 by mode switch 52 in the normal system operation, i.e., during the local focal condition mode. However, when level discriminator 56 detects the out of focus range condition, a discriminator output signal on line 57 triggers the mode switch 52 to couple integrator 54 input to the output of the ramp generator 58. The ramp generator signal drives torque motor 22 to scan the objective lens 14 over its entire dynamic focussing range. Feedback line 59 couples position information to the ramp generator to synchronize the position of the lens drive mechanism with respect to the ramp generator signal. The lens 14 is thus driven from one end limit to the other.

If during scanning a condition occurs that enables the system to focus, i.e., the lens is again brought into the localized focal condition, the discriminator output trigger signal on line 57 is disabled and the mode switch 32 decouples ramp generator 58 and recouples the output of differential amplifier 50 to integrator and driver 54. The system then again operates in the localized focal condition mode with high focus resolution.

The bimodal automatic lens focussing apparatus 10 of the present invention enables the system to have a large dynamic or capture focus range but also maintains a very accurate and precise focus capability. For example, in a microscope based system for automatically analyzing blood cells on laboratory slides, the autofocussing apparatus constructed in accordance with the principles of the present invention, is required to move the objective lens plus or minus 0.005 inch for the localized focal range, and such focussing movement must be done within 10 milliseconds to conform to a required system cell detection/measurement time of 100 milliseconds. The bimodal apparatus 10 of the present invention provided a very accurate and precise focussing range of plus or minus 0.0005 inch within 10 milliseconds in the normal mode of operation, i.e. a local focal condition, and yet was able to cover a larger capture focussing range of plus or minus 0.003 inch by switching when required to the described search and scan mode.

In a constructed embodiment of the invention, the photodiode arrays comprised a line array of 64 self-scanned photodiodes manufactured by Reticon Corporation of Sunnyvale, California and identified as the RL-64P solid state line scanner. Other types of photodiode arrays can be used as the sensors. A row-column matrix array, other types of matrix arrays or even a random array of photodiodes is possible with suitable position synchronizing apparatus.

Mode switch 52 included a Mosfet solid state device. Similar devices are well within the skill of the art for responding to a suitable gating signal from the level discriminator so as to decouple integrator and driver 54 from the differential amplifier 50 and couple the integrator to the ramp generator 58. Torque motor 22 comprised a linear displacement torque motor such as manufactured by Servotronics Inc. of Buffalo, New York. As shown schematically in FIG. 1, the lens carrier frame 20 was mounted on a pair of linear bearings 60. A pair of adjustable springs 62, 64 urges the torque motor tongue 66 into positive engagement with the carrier frame 20. Other types of precise drive means can be used, such as a piezoelectric transducer to move the objective lens 14 into a proper focus position in response to the drive signals.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

What is claimed is:

1. In automatic lens focussing apparatus having an objective lens to be placed at a desired focal plane, a focus sensor located on either side of the focal plane for sensing respective light images, processing means for processing information from said sensors relating to the intensity of said light images, and drive means responsive to said processed information for moving said lens to the desired focal plane in a localized focal condition, the improvement comprising:

each of said focus sensors including, a photodiode array sensing a light image at respective locations, and scanning means for scanning said photodiode array to provide respective signals to said processing means corresponding to the relative intensity of said light images; and detection-switch means intermediate said processing means and said drive means and responsive to said processed information for selectively initiating a search mode wherein said lens is moved to scan and reacquire said localized focal condition upon detection of a loss of said localized focal condition.

2. The improvement of claim 1, wherein said detection-switch means includes a level discriminator responsive to said processed information to sense a loss of said localized focal condition and provide a search mode initiation signal.

3. The improvement of claim 2, wherein said level discriminator includes means for comparing the sum of the signal level of said processed information from said sensors with a preset discriminator signal level.

4. The improvement of claim 2, wherein said detection-switch means includes mode switch means coupled to said level discriminator and responsive to said search mode initiation signal for initiating said search mode.

5. The improvement of claim 1, wherein said detection-switch means includes ramp generator means providing a scan signal coupled to said drive means in said search mode for scanningly moving said lens between the outer limits of lens movement.

6. The improvement of claim 1, wherein said detection-switch means includes a level discriminator operative during said search mode to sense a reacquiring of said localized focal condition.

7. The improvement of claim 6, wherein said detection-switch means includes mode switch means coupled to said level discriminator and responsive to said reacquiring of said localized focal condition for disabling said search mode.

8. The improvement of claim 5, wherein said detection-switch means includes mode switch means coupled intermediate the output of said ramp generator means and the input to said drive means, said mode switch means including means responsive to a detected loss of said localized focal condition for coupling said scan signal to said drive means and otherwise blocking said scan signal from said drive means.

9. The improvement of claim 1, wherein said photodiode array comprises a plurality of photodiodes in a line array.

10. In automatic lens focussing apparatus having an objective lens to be placed at a desired focal plane, a focus sensor located on either side of the focal plane for sensing respective light images, processing means for processing information from said sensors relating to the intensity of said light images, and drive means responsive to said processed information for moving said lens to the desired focal plane in a localized focal condition, the improvement comprising:

each of said focus sensors including, a photodiode array including a plurality of photodiodes sensing a light image at respective locations, and scanning means for scanning said photodiode array to provide respective signals to said processing means corresponding to the relative intensity of said light images;

detection means monitoring said processed information for sensing a loss in said localized focal condition and including means for initiating a search mode;

ramp generator means providing a scanning signal for driving said drive means during said search mode;

mode switch means responsive to the initiation of said search mode for decoupling said processed information from said drive means and for coupling said scanning signal to said drive means; and said detection means further including means responsive to a reacquiring of said localized focal condition for directing said mode switch means to decouple said scanning signal from said drive means and to recouple said processed information to said drive means.

* * * * *